(12) United States Patent
Nam

(10) Patent No.: US 8,195,832 B2
(45) Date of Patent: Jun. 5, 2012

(54) FACILITATING MANAGEMENT OF LAYER 2 HARDWARE ADDRESS TABLE BASED ON PACKET PRIORITY INFORMATION

(75) Inventor: Scott Nam, Encino, CA (US)

(73) Assignee: Alcatel Lucent, Paris (FR)

( * ) Notice: Subject to any disclaimer, the term of this patent is extended or adjusted under 35 U.S.C. 154(b) by 660 days.

(21) Appl. No.: 12/001,648

(22) Filed: Dec. 12, 2007

(65) Prior Publication Data

US 2009/0158006 A1 Jun. 18, 2009

(51) Int. Cl.
*G06F 15/173* (2006.01)

(52) U.S. Cl. ......... 709/238; 709/227; 370/254; 370/255

(58) Field of Classification Search .................. 709/227, 709/238; 370/254–255
See application file for complete search history.

(56) References Cited

U.S. PATENT DOCUMENTS

| | | | | |
|---|---|---|---|---|
| 5,914,938 A * | 6/1999 | Brady et al. | .................. | 370/254 |
| 5,926,626 A * | 7/1999 | Takeuchi et al. | ............. | 709/249 |
| 6,304,578 B1 * | 10/2001 | Fluss | ............................. | 370/413 |
| 6,732,184 B1 * | 5/2004 | Merchant et al. | ............ | 709/238 |
| 7,460,528 B1 * | 12/2008 | Chamdani et al. | ........... | 370/381 |
| 7,477,601 B1 * | 1/2009 | Waclawsky et al. | .......... | 370/232 |
| 7,480,293 B2 * | 1/2009 | Betker | .......................... | 370/389 |
| 7,660,259 B1 * | 2/2010 | Grosser et al. | ................ | 370/252 |
| 7,733,894 B1 * | 6/2010 | Giacobbe et al. | ............. | 370/415 |
| 2003/0099201 A1 * | 5/2003 | Hu et al. | ........................ | 370/236 |
| 2003/0137989 A1 * | 7/2003 | Nagai | ............................ | 370/455 |
| 2003/0174711 A1 * | 9/2003 | Shankar | .................... | 370/395.53 |
| 2005/0083952 A1 * | 4/2005 | Swain | ........................... | 370/401 |
| 2006/0098680 A1 * | 5/2006 | Kelesoglu et al. | ............ | 370/444 |
| 2008/0235424 A1 * | 9/2008 | Lee et al. | ..................... | 710/260 |
| 2008/0239957 A1 * | 10/2008 | Tokura et al. | ................ | 370/235 |

\* cited by examiner

*Primary Examiner* — Emmanuel L Moise
*Assistant Examiner* — Sarah Drabik
(74) *Attorney, Agent, or Firm* — Hitt Gaines, PC

(57) ABSTRACT

A network switching device comprises hardware address table storage space, a priority comparison mechanism, and an address table management mechanism. The hardware address table storage space having a number of entries therein. Each one of the entries within the hardware address table storage space includes respective information designating a priority of a respective source network address. The priority comparison mechanism is configured for comparing the priority designating information of the received packet with the priority designating information of at least a portion of the entries within the hardware address table storage space in response to determining that a number of entries within the hardware address table storage space is equal to a capacity of the hardware address table storage space. The address table management mechanism is configured for replacing an entry within the hardware address table storage space with an entry having contents corresponding to the received packet in response to determining that a priority level corresponding to the priority designating information of the received packet is higher than a priority level corresponding to the priority designating information of the replaced entry.

18 Claims, 2 Drawing Sheets

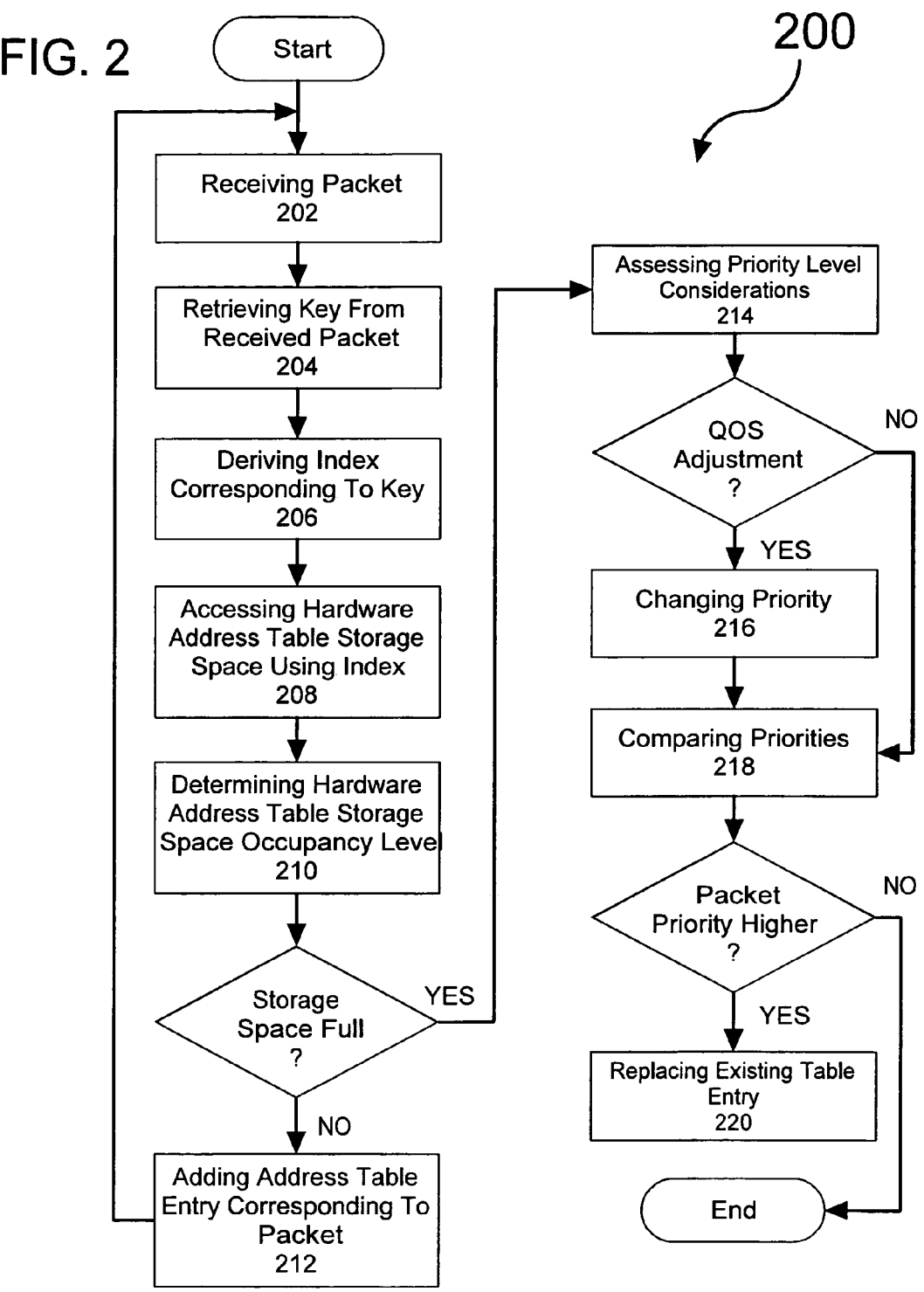

FACILITATING MANAGEMENT OF LAYER 2 HARDWARE ADDRESS TABLE BASED ON PACKET PRIORITY INFORMATION

FIELD OF THE DISCLOSURE

The disclosures made herein relate generally to switching of Layer 2 (L2) packets in a network and, more particularly, to facilitating management of a L2 hardware address table based on packet priority information.

BACKGROUND

In a network switch ASIC (Application-Specific Integrated Circuit), L2 packets are switched based on a lookup on a L2 hardware (HW) address table. Such a L2 HW address table is hereinafter referred to as a L2 table. L2 hardware refers to a network device (e.g., a switch) that forwards traffic based on MAC (Media Access Control) layer addresses (e.g., Ethernet or Token Ring addresses).

A L2 address table includes entries for one or more network devices (i.e. L2 hardware such as, for example, a switch). Typically, each entry in the L2 table includes source MAC address information, VLAN (Virtual Local Area Network) information, and source port information. Because table look-up and L2 switching functionalities are performed by L2 hardware, it is important to have a source L2 address learned (or programmed) on the L2 table for each of such L2 hardware. Otherwise, if the lookup fails, the packets destined to that source L2 address would be dropped or flooded out to multiple ports.

Due to the limited size of memory (e.g., telecommunication access method (TCAM) or communication access method (CAM)) of a network switch ASIC, the size of a L2 table is usually limited to 16K or 32K entries. Furthermore, a hashing algorithm is used to manage (e.g., compress) information used to access contents within the L2 table in a manner that provides for faster accessing (i.e., look-up) of such contents. Hashing is the transformation of a string of characters (e.g., the MAC address) into what is typically a shorter fixed-length value (i.e., a key) that represents the original string. It is advantageous to use hashing for indexing and retrieving contents of a hardware address table (i.e., table entry information) because it is faster to find such content using the shorter hashed key than it is to find this same information using the original value. Because of the nature of the hashing algorithm, particularly hash collision and the depth of the hashing bucket, there are instances in which new entries cannot be added to the L2 table. For example, as shown in FIG. 1, a plurality of L2 packets are received from each of three different MAC addresses (i.e., MAC address A, MAC address B, and MAC address C). For each of the packets, a respective key is retrieved (e.g., its MAC address) and is used in deriving a respective index. The objective is to store contents of each packet (e.g., source MAC address information, VLAN (Virtual Local Area Network) information, and source port information) in a L2 table in paired combination with the respective index. In this manner, contents of a respective packet can be accessed within the L2 table though use of the key of the respective packet. However, as can be seen in FIG. 1, MAC address A, MAC address B and MAC address C all have the same index (e.g., index "120") and, thus, exhibit hash collision. It can also be seen that the size of the hash bucket is 2 (i.e., 2 entries). Accordingly, the contents of the packets from MAC address A and MAC address B are added to the hash bucket (i.e., added as L2 table entries), which was previously empty. The contents of the packet from MAC address C, however, cannot be added because after adding the contents of the packets from MAC address A and MAC address B, the hash bucket is full.

A problem that exists with current (i.e., prior art) implementations of managing L2 tables is that there is no consideration of packet priority when it comes to adding an entry to the L2 table. Thus, in the case of the example discussed above in reference to FIG. 1, the contents of the packets from MAC address C are not learned (i.e., stored in the L2 table) even if the packet priority of packet from MAC address C is higher than that of MAC address A or MAC address B. The situation is further complicated if MAC address C is a router MAC address or an address of a server because the network device corresponding to MAC address C will be unknown to an associated network switch ASIC, resulting in all the packets destined for the network device of MAC address C being flooded.

Therefore, facilitating management of a L2 hardware address table in a manner that relies upon packet priority information will overcome drawbacks associated with conventional (i.e., prior art) approaches for facilitating management of a L2 hardware address table and, thus, would be advantageous, desirable and useful.

SUMMARY OF THE DISCLOSURE

Embodiments of the present invention facilitate management of a hardware address table (e.g., a layer 2 hardware address table) in a manner that seeks to ensure that a packet with a high priority will not be adversely affected by hashing collision with a packet having a lower priority. More specifically, embodiments of the present invention compare the priority level of hardware address table entries within a hash bucket with that of a proposed new entry to the hash bucket. In doing so, if a priority level of the proposed new entry to the hash bucket is greater than the respective priority levels of the hardware address table entries within the hash bucket, one of the hardware address table entries within the hash bucket is replaced by the proposed new entry. In this manner, embodiments of the present invention advantageously overcome one or more shortcomings associated with conventional approaches for facilitating management of a hardware address table.

In one embodiment of the present invention, a method for facilitating management of a hardware address table storage space comprises a plurality of operations. An operation is performed for receiving a packet having contents configurable as an entry within a hardware address table storage space. Such contents include information designating a priority of a respective source network address. An operation is performed for determining that a number of entries within the hardware address table storage space is equal to a capacity of the hardware address table storage space. Each one of the entries within the hardware address table storage space includes respective information designating a priority of a respective source network address. An operation is performed for comparing the priority designating information of the received packet with the priority designating information of at least a portion of the entries within the hardware address table storage space in response to determining that a number of entries within the hardware address table storage space is equal to a capacity of the hardware address table storage space. Thereafter, an operation is performed for replacing an entry within the hardware address table storage space with an entry having contents corresponding to the received packet in response to determining that a priority level corresponding to the priority designating information of the received packet is higher than a priority level corresponding to the priority designating information of the replaced entry.

In another embodiment of the present invention, a data storage device has a set of processor-executable instructions stored thereon. The set of processor-executable instructions comprises instructions for carrying out various functionality for facilitating management of a hardware address table. Instructions are provided for populating a hardware address table storage space with entries. Each one of the entries includes respective information designating a priority of a respective source network address. Instructions are provided for comparing priority designating information of a received packet with the priority designating information of at least a portion of the entries within the hardware address table storage space in response to determining that a number of entries within the hardware address table storage space is equal to a capacity of the hardware address table storage space. Instructions are provided for replacing an entry within the hardware address table storage space with an entry having contents corresponding to the received packet in response to determining that a priority level corresponding to the priority designating information of the received packet is higher than a priority level corresponding to the priority designating information of the replaced entry.

In another embodiment of the present invention, a network switching device comprises hardware address table storage space, a priority comparison mechanism, and an address table management mechanism. The hardware address table storage space has a number of entries therein. Each one of the entries within the hardware address table storage space includes respective information designating a priority of a respective source network address. The priority comparison mechanism is configured for comparing the priority designating information of the received packet with the priority designating information of at least a portion of the entries within the hardware address table storage space in response to determining that a number of entries within the hardware address table storage space is equal to a capacity of the hardware address table storage space. The address table management mechanism is configured for replacing an entry within the hardware address table storage space with an entry having contents corresponding to the received packet in response to determining that a priority level corresponding to the priority designating information of the received packet is higher than a priority level corresponding to the priority designating information of the replaced entry.

For improved processing efficiency and/or speed, implementing embodiments of the present invention in hardware is advantageous. However, if hash collision is notified to software (i.e., instruction set for carrying out table management functionality in accordance with the present invention) associated with such hardware, embodiments of the present invention can be implemented within such hardware. In this case, the software can change the priority of a packet based on the QoS (Quality of Service) rule in conjunction with performing comparison of packet and table entry priorities.

These and other objects, embodiments, advantages and/or distinctions of the present invention will become readily apparent upon further review of the following specification, associated drawings and appended claims.

BRIEF DESCRIPTION OF THE DRAWINGS

FIG. 2 is shows a method for facilitating management of a hardware address table in a accordance with an embodiment of the present invention.

DETAILED DESCRIPTION OF THE DRAWING FIGURES

Figure 1:
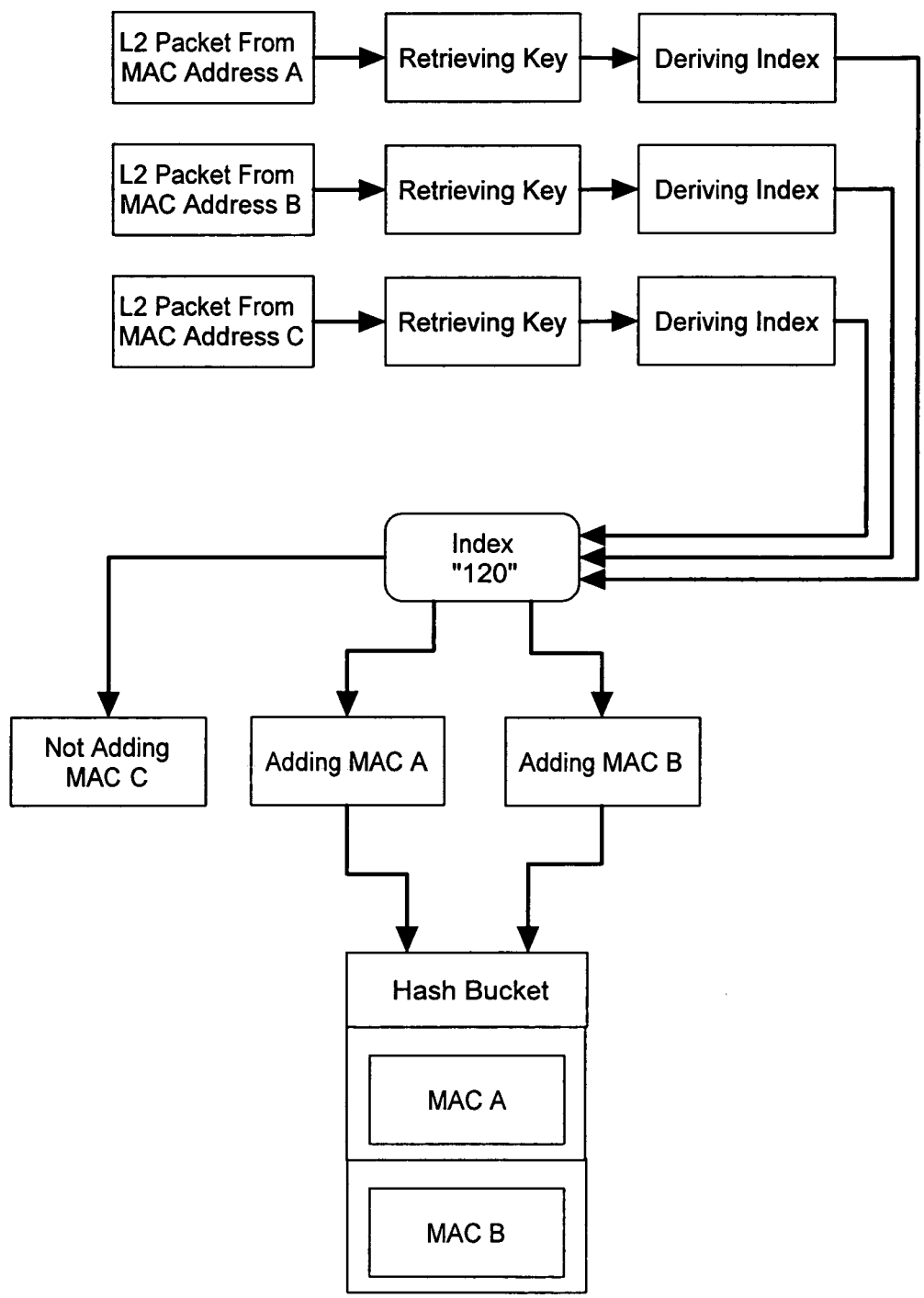
FIG. 1 shows a prior art implementation of facilitating management of a hardware address table.

Referring to FIG. 2, a method 200 is shown for facilitating management of a hardware address table storage space in accordance with an embodiment of the present invention. The method 200 facilitates management of a hardware address table (e.g., a layer 2 hardware address table) in a manner that seeks to ensure that a packet with a high priority will not be adversely affected by hashing collision with a packet having a lower priority. In doing so, the method 200 advantageously overcomes one or more shortcomings associated with conventional approaches for facilitating management of a hardware address table and, in particular, facilitating management of a hardware address table in view of hash collision.

The method 200 begins with an operation 202 being performed for receiving a packet (e.g., a layer 2 packet) from having a designated network address (e.g., a MAC address). In response to receiving the packet, an operation 204 is performed for retrieving a key from the packet, followed by an operation 206 being performed for deriving an index corresponding to the key. In one implementation of the present invention, such retrieving and deriving are performed by an algorithm configured to access designated contents of the packet that contain the key and is configured to apply hashing technique for deriving the index from the key. The present invention is not unnecessarily limited to a particular algorithm or hashing technique.

After deriving the index, an operation 208 is performed for accessing storage space in which a table of hardware address entries are maintained and which corresponds to the index. Such table is generally referred to as a hardware address table (e.g., a layer 2 hardware address table) and, thus, such storage space is referred to herein as hardware address table storage space. In one embodiment, the hardware address table storage space can be one of a plurality of different hash buckets residing within a memory device. In another embodiment, the hardware address table storage space can be a single memory space in which hardware address table entries are maintained. In response to accessing the hardware address table storage space, an operation 210 is performed for determining an occupancy level of the hardware address table storage space. In doing so, it is determined whether the hardware address table storage space is full of entries (i.e., whether its capacity has been reached). Thereafter, if it is determined that the hardware address table storage space is not at its capacity (i.e., not full of entries), an operation 212 is performed for adding an entry corresponding to the packet to the hardware address table, followed by the method continuing at the operation 202 for receiving a packet (i.e., another packet). Adding the entry includes adding the entry dependent upon the index. For example, in one implementation, the entry is added to a hash bucket corresponding to the index.

If it is determined that the hardware address table storage space is at its capacity (i.e., full of entries), the method continues at an operation 214 for assessing whether a priority level of the received packet can be adjusted (i.e., assessing priority level considerations). Such adjustment may include increasing or decreasing a current priority level of the packet. For example, the operation 214 for assessing whether the priority level of the received packet should be changed can include assessing QoS rules that designate conditions in which the priority level of the received packet should be increased or decreased relative to entries assessed within the hardware address table storage space. If it is determined that the priority level of the packet needs to be changed, an operation 216 is performed for changing the priority level accordingly, followed by an operation 218 being performed for comparing the priority level of the received packet and the respective priority of each on of the entries in the hardware address table storage space. Otherwise, the method skips the operation 216 for adjusting the priority level and continues at the operation 218 for comparing the priority level of the received packet (i.e., non-adjusted priority level) and the respective priority of each on of the entries in the hardware address table storage space. It is disclosed herein that the operation for changing the priority level can be performed in conjunction with (e.g., during) the operation for comparing the priority level of the received packet.

If it is determined that the priority level of the received packet is higher than the respective priority of a particular one of the entries in the hardware address table storage space, an operation 220 is performed for replacing that particular entry with an entry having contents corresponding to the received packet. Otherwise the method ends without adding to the hardware address table an entry corresponding to the received packet.

Referring now to processor-executable instructions and a device from which such instructions are accessible, it will be understood from the disclosures made herein that methods, processes and/or operations adapted for carrying out hardware address table management functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out hardware address table management functionality in accordance with the present invention.

It is disclosed herein that equipment configured for facilitating hardware address table management functionality in accordance with the present invention can be embodied as a network switching device. In one such embodiment, the network switching device comprises hardware address table storage space, a priority comparison mechanism, and an address table management mechanism interconnected for enabling interaction therebetween. The present invention is not limited to specific implementations of system components that represent the hardware address table storage space, the priority comparison mechanism or the address table management mechanism. To the contrary, functionality associated with the hardware address table storage space, the priority comparison mechanism, and the address table management mechanism can be implemented in any number of different manners. To this end, the hardware address table storage space provides the functionality of storing/holding entries corresponding to contents of received packets, the priority comparison mechanism provides functionality of comparing priority designating information of a received packet with priority designating information of at least a portion of the entries within a hardware address table, and the address table management mechanism provides functionality of replacing an entry within the hardware address table with an entry having contents corresponding to the received packet in response to determining that a priority level corresponding to the priority designating information of the received packet is higher than a priority level corresponding to the priority designating information of the replaced entry.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating management of a hardware address table storage space, comprising:

at least one data processing device accessing, from memory coupled to said at least one data processing device, instructions causing said at least one data processing device to perform an operation receiving a packet having information thereof configurable as an entry within a hardware address table storage space, wherein said information thereof includes information designating a priority of a respective source network address;

said at least one data processing device accessing, from said memory, instructions causing said at least one data processing device to perform an operation for determining that a number of entries within the hardware address table storage space is equal to a capacity of the hardware address table storage space, wherein each one of said entries within the hardware address table storage space includes respective information designating a priority of a respective source network address;

said at least one data processing device accessing, from said memory, instructions causing said at least one data processing device to perform an operation for adjusting a priority level of said received packet to be different than an as-received priority level of the packet thereby creating adjusted priority designating information for said received packet, wherein adjusting the priority level is performed at least partially dependent upon rules designating a condition under which the priority level of said received packet is to be adjusted with respect to priority levels of said entries within the hardware address table storage space and said adjusting includes an option of both increasing and decreasing said priority level;

said at least one data processing device accessing, from said memory, instructions causing said at least one data processing device to perform an operation for comparing said adjusted priority designating information of said received packet with said priority designating information of at least a portion of said entries within the hardware address table storage space in response to determining that a number of entries within the hardware address table storage space is equal to a capacity of the hardware address table storage space; and said at least one data processing device accessing, from said memory, instructions causing said at least one data processing device to perform an operation for replacing an entry within the hardware address table storage space with an entry having contents corresponding to said received packet in response to determining that the priority level corresponding to said adjusted priority designating information of said received packet is higher than a priority level corresponding to said priority designating information of said replaced entry.

2. The method of claim 1 wherein:

the hardware address table storage space is a hash bucket.

3. The method of claim 2, further comprising:

said at least one data processing device accessing, from said memory, instructions causing said at least one data processing device to perform an operation for retrieving a key from said received packet in response to receiving the packet;

said at least one data processing device accessing, from said memory, instructions causing said at least one data processing device to perform an operation for deriving an index using the key in response to retrieving the key; and said at least one data processing device accessing, from said memory, instructions causing said at least one data processing device to perform an operation for determining the hash bucket from a plurality of hash buckets prior to determining that the number of entries within the hash bucket is equal to the capacity of the hash bucket.

4. The method of claim 3, further comprising:

said at least one data processing device accessing, from said memory, instructions causing said at least one data processing device to perform an operation changing a priority of the entry having contents corresponding to said received packet one of in conjunction with performing said comparing or prior to performing said comparing.

5. The method of claim 1, further comprising:

said at least one data processing device accessing, from said memory, instructions causing said at least one data processing device to perform an operation changing a priority of the entry having contents corresponding to said received packet one of in conjunction with performing said comparing or prior to performing said comparing.

6. The method of claim 1, further comprising:

said at least one data processing device accessing, from said memory, instructions causing said at least one data processing device to perform an operation for retrieving a key from said received packet in response to receiving the packet;

said at least one data processing device accessing, from said memory, instructions causing said at least one data processing device to perform an operation deriving an index using the key in response to retrieving the key; and said at least one data processing device accessing, from said memory, instructions causing said at least one data processing device to perform an operation determining the hardware address table storage space from a plurality of hardware address table storage spaces prior to determining that the number of entries within the hardware address table storage space is equal to the capacity of the hardware address table storage space.

7. A data storage device having a set of processor-executable instructions stored thereon, the set of processor-executable instructions comprising:

instructions for populating hardware address table storage space with entries, wherein each one of said entries includes respective information designating a priority of a respective source network address;

instructions for adjusting a priority level of a received packet to be different than an as-received priority level of said received packet thereby creating adjusted priority designating information for said received packet, wherein adjusting the priority level is performed at least partially dependent upon rules designating a condition under which the priority level of said received packet is to be adjusted with respect to priority levels of said entries within the hardware address table storage space and said adjusting includes an option of both increasing and decreasing said priority level;

instructions for comparing said adjusted priority designating information of said received packet with said priority designating information of at least a portion of said entries within the hardware address table storage space in response to determining that a number of entries within the hardware address table storage space is equal to a capacity of the hardware address table storage space; and instructions for replacing an entry within the hardware address table storage space with an entry having contents corresponding to said received packet in response to determining that a priority level corresponding to said priority designating information of said received packet is higher than a priority level corresponding to said priority designating information of said replaced entry.

8. The data storage device of claim 7 wherein:

the hardware address table storage space is a hash bucket.

9. The data storage device of claim 8, further comprising:

instructions for retrieving a key from said received packet;

instructions for deriving an index using the key in response to retrieving the key; and instructions for determining the hash bucket from a plurality of hash buckets prior to determining that the number of entries within the hash bucket is equal to the capacity of the hash bucket.

10. The data storage device of claim 9, further comprising:

instructions for changing a priority of the entry having contents corresponding to said received packet one of in conjunction with performing said comparing or prior to performing said comparing.

11. The data storage device of claim 7, further comprising:

instructions for changing a priority of the entry having contents corresponding to said received packet one of in conjunction with performing said comparing or prior to performing said comparing.

12. The data storage device of claim 7, further comprising:

instructions for retrieving a key from said received packet;

instructions for deriving an index using the key in response to retrieving the key; and instructions for determining the hardware address table storage space from a plurality of hardware address table storage spaces prior to determining that the number of entries within the hardware address table storage space is equal to the capacity of the hardware address table storage space.

13. A network switching device, comprising:

hardware address table storage space having a number of entries therein, wherein each one of said entries within the hardware address table storage space includes respective information designating a priority of a respective source network address;

a priority level adjustment mechanism configured for adjusting a priority level of a received packet to be different than an as-received priority level of said received packet thereby creating adjusted priority designating information for said received packet, wherein adjusting the priority level is performed at least partially dependent upon rules designating a condition under which the priority level of said received packet is to be adjusted with respect to priority levels of said entries within the hardware address table storage space and said adjusting includes an option of both increasing and decreasing said priority level;

a priority comparison mechanism configured for comparing said adjusted priority designating information of the received packet with said priority designating information of at least a portion of said entries within the hardware address table storage space in response to determining that a number of entries within the hardware address table storage space is equal to a capacity of the hardware address table storage space; and an address table management mechanism configured for replacing an entry within the hardware address table storage space with an entry having contents corresponding to said received packet in response to determining that the priority level corresponding to said adjusted priority designating information of said received packet is higher than a priority level corresponding to said priority designating information of said replaced entry.

14. The network switching device of claim 13 wherein:
the hardware address table storage space is a hash bucket.

15. The network switching device of claim 14 wherein the address table management mechanism is configured for:
retrieving a key from said received packet;
deriving an index using the key in response to retrieving the key; and
determining the hash bucket from a plurality of hash buckets prior to determining that the number of entries within the hash bucket is equal to the capacity of the hash bucket.

16. The network switching device of claim 15 wherein the address table management mechanism is configured for:
changing a priority of the entry having contents corresponding to said received packet one of in conjunction with performing said comparing or prior to performing said comparing.

17. The network switching device of claim 13 wherein the address table management mechanism is configured for:
changing a priority of the entry having contents corresponding to said received packet one of in conjunction with performing said comparing or prior to performing said comparing.

18. The network switching device of claim 13 wherein the address table management mechanism is configured for:
retrieving a key from said received packet;
deriving an index using the key in response to retrieving the key; and
determining the hardware address table storage space from a plurality of hardware address table storage spaces prior to determining that the number of entries within the hardware address table storage space is equal to the capacity of the hardware address table storage space.

* * * * *